J. W. STIGLITZ.
DISPENSING APPARATUS.
APPLICATION FILED JULY 24, 1919.

1,379,291.

Patented May 24, 1921.
4 SHEETS—SHEET 1.

INVENTOR
John W. Stiglitz
BY John A. Naismith
HIS ATTORNEY

J. W. STIGLITZ.
DISPENSING APPARATUS.
APPLICATION FILED JULY 24, 1919.
1,379,291.
Patented May 24, 1921.
4 SHEETS—SHEET 2.
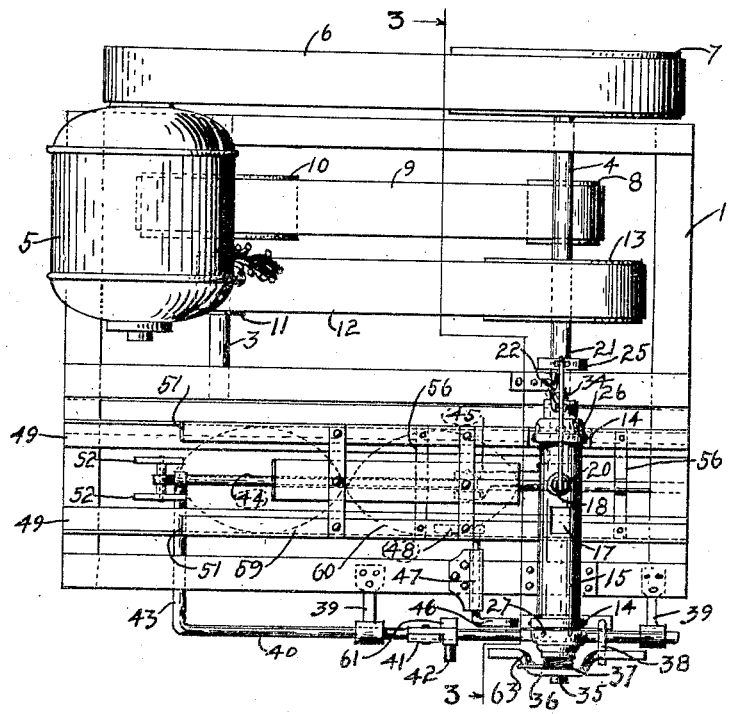
FIGURE 2
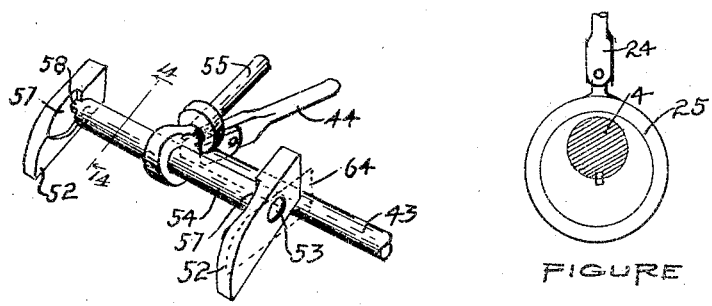
FIGURE 5
FIGURE 6
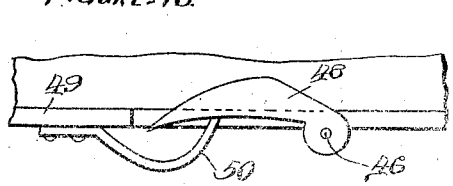
FIGURE 13.
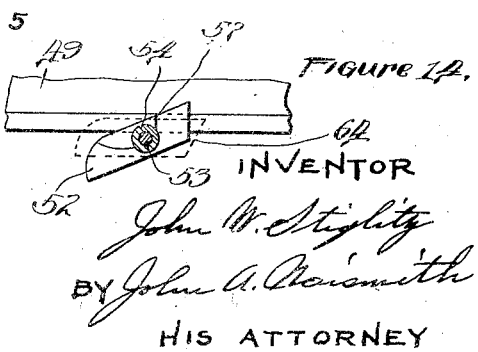
Figure 14.
INVENTOR
John W. Stiglitz
BY John A. Naismith
HIS ATTORNEY

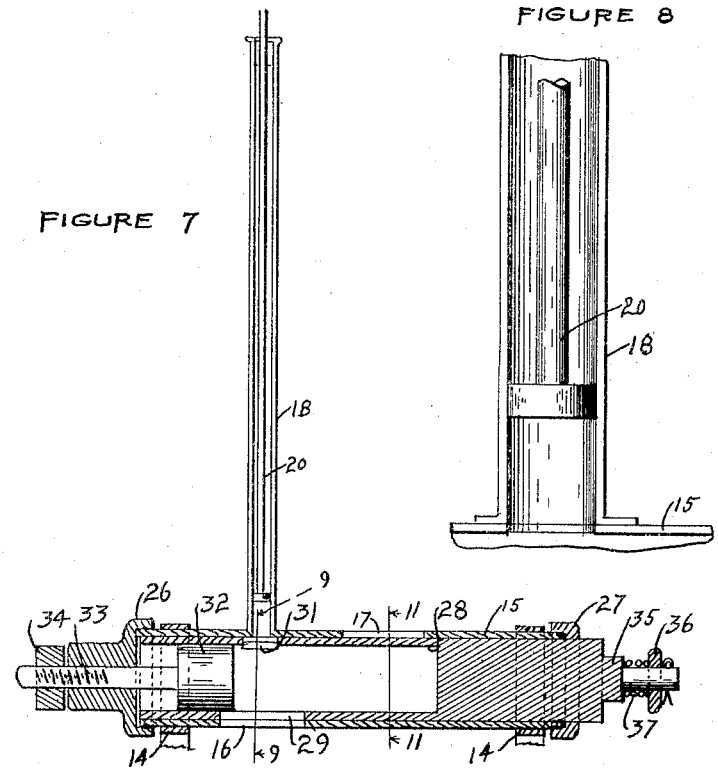
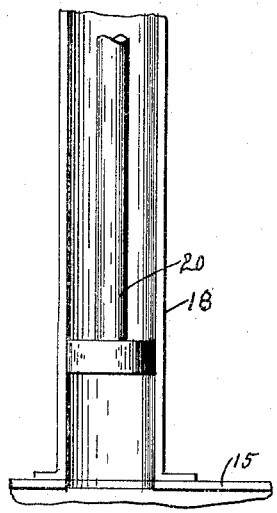
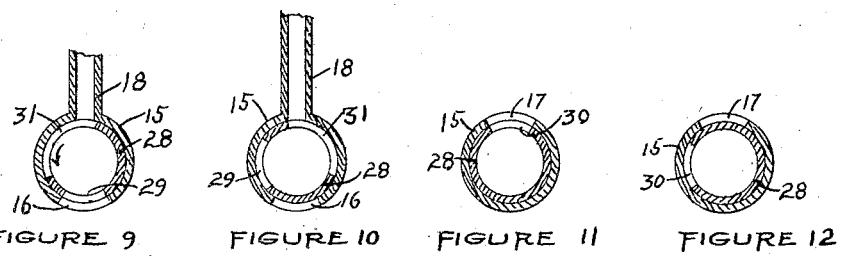

UNITED STATES PATENT OFFICE.

JOHN W. STIGLITZ, OF SAN JOSE, CALIFORNIA.

DISPENSING APPARATUS.

1,379,291.  Specification of Letters Patent.  Patented May 24, 1921.

Application filed July 24, 1919. Serial No. 312,909.

*To all whom it may concern:*

Be it known that I, JOHN W. STIGLITZ, a citizen of the United States, and resident of San Jose, in the county of Santa Clara and State of California, have invented certain new and useful Improvements in Dispensing Apparatus, of which the following is a specification.

My invention relates to a machine for dispensing a predetermined amount of a given substance in each of a succession of receptacles passed therethrough.

It is the object of my invention to provide a machine that will automatically receive and position a receptacle, deposit therein a predetermined amount of a given substance, and replace the same with another receptacle without undue mechanical complication; that can be adapted for use with receptacles of any form or size, and that provides a positive feed of the given substance in any required amount. It is a further object of my invention to provide a machine of the character indicated that will perform its work smoothly and uniformly, with rapidity, accuracy and neatness.

In the drawing:—

Fig. 2 is plan view of the machine.

Fig. 5 is a perspective illustration of the receptacle engaging members and parts connected thereto.

Fig. 6 is a side elevation of the eccentric used for operating the pump forming a part of the machine.

Fig. 7 is a sectional view through the measuring and feeding device.

Fig. 8 is a sectional view through a portion of the pump.

Fig. 9 is a sectional view on line 9—9 of Fig. 7 with the discharge passage open.

Fig. 10 is a sectional view on line 9—9 of Fig. 7 with the discharge passage closed.

Fig. 11 is a sectional view on line 11—11 of Fig. 7 with the inlet passage open.

Fig. 12 is a sectional view on line 11—11 of Fig. 7 with the inlet passage closed.

Fig. 13 is an enlarged side elevation of the can operated cam in operative position in a can guide, part only of the guide being shown.

Fig. 14 is a section on line 14—14 of Fig. 5, part of the guide being shown.

Figure 1:
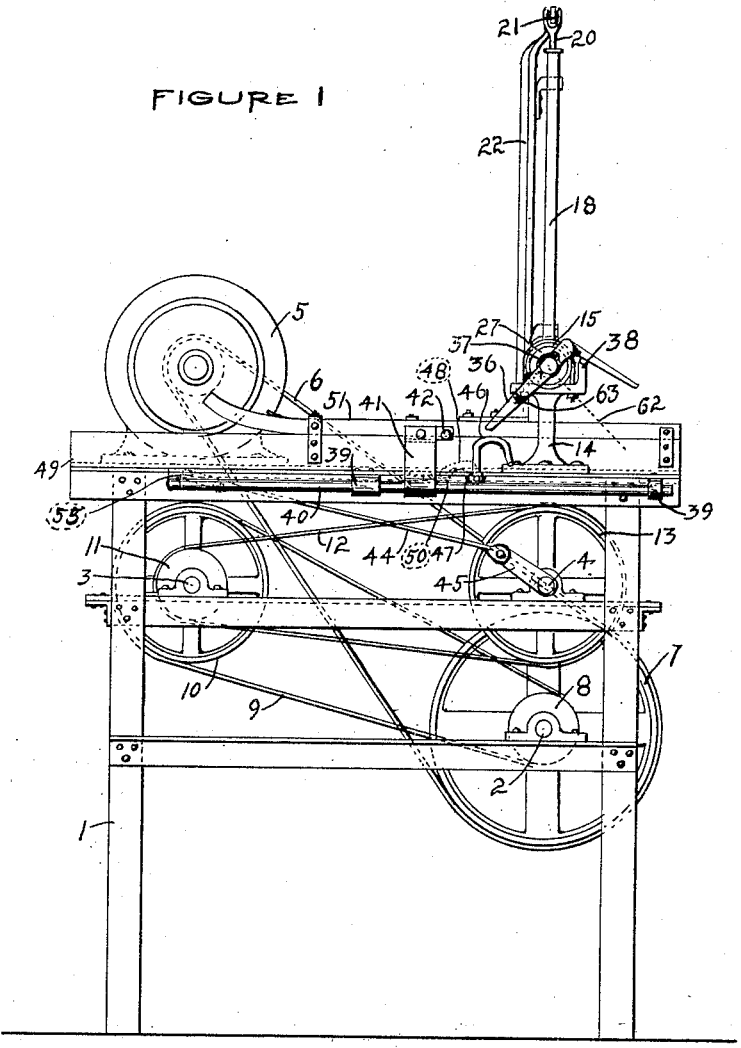
Figure 1 is a side elevation of the machine with the supply conduit removed.
Figure 4:
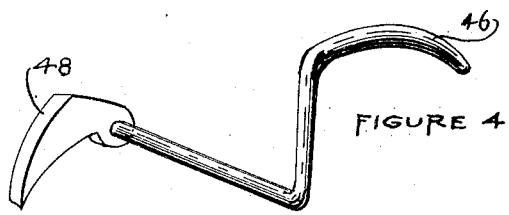
Fig. 4 is a perspective illustration of the receptacle operated pin positioning device.
Figure 3:
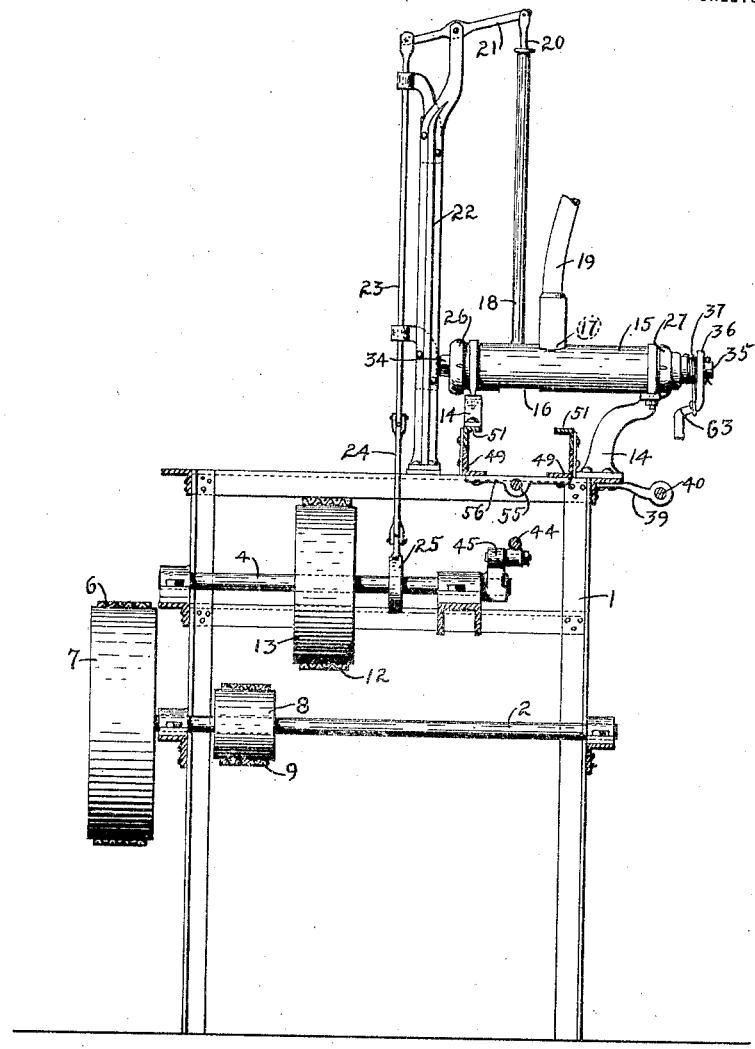
Fig. 3 is a sectional view on line 3—3 of Fig. 2.

Referring more particularly to the drawing, 1 indicates a frame having shafts 2—3 and 4 revolubly mounted thereon in suitable bearings in the relative positions shown and also having motor 5 operatively mounted thereon as shown. Shaft 2 is driven by belt 6 through the medium of pulley 7. Shaft 3 is driven through the medium of pulley 8 on shaft 2, belt 9 and pulley 10. Shaft 4 is driven through the medium of pulley 11 on shaft 3, belt 12 and pulley 13, the shaft 4 operating the moving parts hereinafter described.

Mounted on frame 1 and on standards 14, is a horizontally and transversely positioned hollow cylinder 15 provided with a discharge outlet 16 on its under side, an inlet 17 on its upper side and having a pump 18 connected thereto in axial alinement with discharge outlet 16, the inlet 17 being connected to a source of supply not shown by conduit 19. The plunger 20 of pump 18 is operated by a lever 21 pivotally mounted on standard 22 on frame 1, and links 23 and 24 operated by shaft 4 through the medium of an eccentric 25.

Cylinder 15 is provided at each end with a stuffing box as at 26 and 27 respectively and has a second hollow cylinder 28 provided with discharge opening 29, inlet opening 30 and slot 31, revolubly mounted therein as shown. The inlet and discharge openings are offset a distance longitudinally of the cylinder and they are also offset about one-fourth of the circumference of the cylinder so that when opening 29 registers with outlet 16 the inlet 17 will be closed, and when opening 30 registers with inlet 17 the outlet 16 will be closed. The slot 31 is so positioned that it registers at all times with pump cylinder 18. The amount of fluid discharged through openings 29 and 16 is, in the present case, regulated by means of a movable head 32 fitted closely into cylinder 15 and provided with a stem 33 passing through stuffing box 26 and adjusted through the medium of adjusting nut 34.

Cylinder 28 is provided with a stem 35 passing through stuffing box 27 and carries an arm 36, said arm being normally held in the position shown in Fig. 1 by spring 37 attached thereto and to member 27 as shown, and by a stop 38 mounted on support 14. When in this position the discharge outlet 16 is closed and inlet 17 is open.

The cylinder 28 is revolved in cylinder 15 to open outlet 16 by means of the following mechanism. Mounted to reciprocate in bearings 39 on frame 1 and parallel to said frame, is a rod 40 carrying a member 41 to which is pivotally attached a tripping pin 42 and a plate 61, the latter lying normally in a horizontal plane and extending in the opposite direction from pin 42. The rod 40 is bent inwardly as shown at 43 and is reciprocated by means of a link 44 attached thereto and pivotally connected to arm 45 on shaft 4. Normally pin 42 passes beneath arm 36 but is thrown upwardly into engagement therewith by a finger 46 mounted in bearing 47 on frame 1 and carrying a cam 48 positioned as shown in guides 49 and normally held in the position shown by a spring 50.

In the embodiment of my invention here shown the guides 49 are so proportioned as to receive fish cans of standard size and have auxiliary guides 51 secured thereon to prevent the vertical displacement of the cans.

The cans are moved forward at proper intervals by means of a pair of eccentrically mounted dogs 52 on shaft 53, the latter revolving freely in sleeve 54 which is in turn mounted on the end of guide rod 55 operating in bearings 56. The guide rod 55 and the portion 43 of rod 40 are secured to link 44 as shown so as to be operated simultaneously thereby. Dogs 52 are provided with notches 57 to engage lugs 58 on sleeve 54 so that they are normally held in the position shown in which case they extend upwardly into guides 49 so as to operate as hereinafter described.

Assuming that the machine has been properly assembled and the movements of the several parts properly coördinated with two cans positioned as indicated in dotted lines at 59 and 60 respectively, the can 59 having just been moved into place by any suitable feeding mechanism not shown, and dogs 52 engaging the rear end of the can as shown. The liquid feeding mechanism is proportioned and set to deliver a given small quantity of oil to each can when operated. The operation of link 44 simultaneously moves rods 40 and 55 forwardly so that can 60 is moved under opening 16 in cylinder 15. As this movement takes place the said can engages cam 48 and thereby throws finger 46 upwardly so that it will engage plate 61 on pin 42 and swing pin 42 upwardly on its pivot, the pin 42 thereby engaging arm 36 and forcing the same forward against the tension of spring 37, the movement of arm 36 revolving cylinder 28 to close off opening 17 and to register opening 29 with opening 16. As this registration takes place the plunger 20 in cylinder 18 is forced downward by the several operating parts connecting the same with eccentric 25 whereby a given quantity of the contents of cylinder 28 is discharged into can 60 by a positive feed.

When the pin 42 has advanced to the position 62 it passes over the shoulder 63 of arm 36 thereby releasing the same whereby spring 37 comes into play and snaps the arm and the cylinder 28 back into a normal position with outlet 16 closed and inlet 17 opened. The continued movement of link 44 carries pin 42 back to the position shown and causes dogs 52 to move backwardly under the next can moved into position during which time they assume the position indicated in dotted lines at 64 until the rear end of the can is reached whereupon they automatically drop into engagement therewith as described.

During this latter operation the plunger 20 has been drawn upward in cylinder 18 thereby filling the same with fluid from cylinder 28 through slot 31 therein. As the operation is repeated the filled can is pushed out of position by the forward movement of the following can which in turn is filled and removed as described.

In a construction of this type no liquid is allowed to flow unless a can is in position to receive the same and operates cam 48. The flow of liquid is gradual and it is shut off quickly and positively in such a manner as to prevent filaments, threads or other particles in the liquid from interfering with its action. It is positive in its action with thick liquids such as purées as with clear oils or syrups. Its construction is of such a nature that the danger of jamming of cans is practically eliminated. It is clean in its operation as the cans are moved quickly but steadily so that the liquid is not thrown over the edges of the cans. The feed is positive when the pump 18 is used because the plunger 20 is valveless and draws the liquid into and discharges the same from pump 18 in predetermined quantities, the feed to cylinder 28 being by gravity only.

It is understood that changes in form, proportions, construction and operation may be made within the scope of the appended claims. The embodiment herein shown and described is illustrative of the invention only, as the same may be adapted for use with certain types of solids such as peas, beans, etc., without departing from the scope of the invention.

I claim:—

1. A device of the character indicated, including a pair of telescoped hollow cylinders revolubly mounted with relation to each other, the outer cylinder having a discharge opening and an inlet opening formed therein and a pump operatively mounted thereon to coöperate with said openings for receiving and discharging material, and the inner cylinder having a discharge opening and an inlet opening formed therein and positioned to register alternately with the corresponding openings in the outer cylinder, means for causing the alternate registration of said openings, means coacting with said last mentioned means for positioning a receptacle in operative relation to the discharge opening of said outer cylinder, and means coacting with said last mentioned means for causing the discharge operation of said pump.

2. A device of the character indicated, including a pair of telescoped hollow cylinders revolubly mounted with relation to each other, the outer cylinder having a discharge opening and an inlet opening formed therein, a pump operatively mounted thereon to coöperate with said openings for receiving and discharging material, and the inner cylinder having a discharge opening and an inlet opening formed therein and positioned to register alternately with the corresponding openings in the outer cylinder and having a slot formed therein communicating with said pump, means for causing the alternate registration of said openings, means coacting with said last mentioned means for positioning a receptacle in operative relation to the discharge opening of said outer cylinder, and means coacting with said last mentioned means for causing the discharge operation of said pump.

3. A device of the character indicated, including a pair of telescoped hollow cylinders revolubly mounted with relation to each other, the outer cylinder having a discharge opening and an inlet opening formed therein, a pump operatively mounted thereon to coöperate with said openings for receiving and discharging material, and the inner cylinder having a discharge opening and an inlet opening formed therein and positioned to register alternately with the corresponding openings in the outer cylinder, means for causing the alternate registration of said openings, means coacting with said last mentioned means for positioning a receptacle in operative relation to the discharge opening of said outer cylinder, means coacting with said last mentioned means for causing the discharge operation of said pump, and means for regulating the capacity of said inner cylinder.

4. A device of the character indicated, including a frame, a hollow cylinder fixedly mounted thereon and provided with discharge and inlet openings and having a head in one end thereof, a valveless pump operatively mounted on said fixed cylinder to coöperate with said openings for receiving and discharging material, a hollow cylinder revolubly mounted in said fixed cylinder and provided with discharge and inlet openings adapted to register alternately with the corresponding openings in said fixed cylinder and forming a head to the other end of said fixed cylinder and having a slot formed therein communication with said pump, means for effecting the alternate registration of said discharge and inlet openings at predetermined intervals, and means coacting therewith for positioning a receptacle in operative relation to said discharge openings while their registration is being effected.

5. A device of the character indicated, including a frame, a hollow cylinder mounted thereon and provided with discharge and inlet openings and having a valveless pump operatively mounted thereon to coöperate with said openings in receiving and discharging material and having a head in one end thereof, a hollow cylinder revolubly mounted in said first mentioned cylinder and provided with discharge and inlet openings adapted to register alternately at predetermined intervals with the corresponding openings in said first cylinder and forming a head for the other end thereof, mechanism for positioning a receptacle in operative relation to the discharge opening of said first cylinder, and means for operating and coordinating the action of said pump, said revoluble cylinder and said receptacle positioning means.

6. A device of the character indicated, including a pair of telescoped hollow cylinders revolubly mounted with relation to each other, the outer cylinder having a discharge opening and an inlet opening formed therein and the inner cylinder having a discharge opening and an inlet opening formed therein positioned to register alternately with the corresponding openings in the outer cylinder, means for causing the gradual registration of said discharge openings, means coacting with said last mentioned means for positioning a receptacle in operative relation to said discharge openings, and means for causing the sudden revolution of the inner cylinder to effect registration of the said inlet openings.

7. A device of the character indicated, including the combination with a frame, a hollow cylinder fixedly mounted thereon and provided with discharge and inlet openings and having a head in one end thereof, and a hollow cylinder revolubly mounted in said fixed cylinder and provided with discharge and inlet openings adapted to register alternately with the corresponding openings in said fixed cylinder, of means for effecting the alternate registration of said openings, said means comprising an arm mounted on said inner cylinder and resiliently connected to said outer cylinder, a stop on said frame engaging one end of said arm, an offset in the opposite end of said arm, a rod mounted to reciprocate on said frame adjacent said arm, a pin pivotally mounted on said rod, and receptacle operated means for throwing said pin into engagement with the offset portion of said arm.

8. In a device of the character indicated, the combination with a frame, a hollow cylinder fixedly mounted thereon and provided with discharge and inlet openings, and a hollow cylinder revolubly mounted in said fixed cylinder and provided with discharge and inlet openings adapted to register alternately with the corresponding openings in said fixed cylinder, of means for effecting the alternate registration of said openings, said means comprising an arm mounted on said inner cylinder and resiliently connected to said outer cylinder, a stop on said frame engaging one end of said arm, an offset formed in the opposite end of said arm, a rod mounted to reciprocate on said frame adjacent said arm, a pin pivotally mounted on said rod, a rod revolubly mounted on said frame provided with a finger adapted to be thrown into engagement with said pivotally mounted pin, and a cam positioned to lie in the path of travel of the said receptacles whereby said finger is operated to throw said pin into engagement with the offset portion of said arm.

9. In a device of the character indicated, the combination with a frame, a hollow cylinder fixedly mounted thereon and provided with discharge and inlet openings, and a hollow cylinder revolubly mounted in said fixed cylinder and provided with discharge and inlet openings adapted to register alternately with the corresponding openings in said fixed cylinder, of coöperating means for effecting the alternate registration of said openings and for positioning a receptacle in operative relation to said discharge openings during the period of their registration and comprising a pair of operatively mounted parallel reciprocating rods and means for simultaneously reciprocating said rods, one rod carrying automatically operated means for engaging a receptacle to move the same toward said cylinder and the other rod carrying a pivotally mounted pin, receptacle operated means for moving said pin on its pivot into an operative position, and means carried by said inner cylinder adapted to engage said pin when in an operative position to rotate said cylinder, and means for releasing and returning said cylinder to its former position after a predetermined interval.

JOHN W. STIGLITZ.